(12) United States Patent
Choi et al.

(10) Patent No.: US 10,612,985 B2
(45) Date of Patent: Apr. 7, 2020

(54) FORCE/TORQUE SENSOR THAT MINIATURIZATION IS AVAILABLE

(71) Applicant: Research & Business Foundation Sungkyunkwan University, Suwon-si (KR)

(72) Inventors: Hyouk Ryeol Choi, Gunpo-si (KR); Ui Kyum Kim, Anseong-si (KR); Yong Bum Kim, Goyang-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 114 days.

(21) Appl. No.: 15/923,274

(22) Filed: Mar. 16, 2018

(65) Prior Publication Data

US 2019/0094085 A1    Mar. 28, 2019

(30) Foreign Application Priority Data

Mar. 16, 2017  (KR) .......................... 10-2017-0033296

(51) Int. Cl.
| | |
|---|---|
| *G01L 1/00* | (2006.01) |
| *G01L 1/14* | (2006.01) |
| *G01L 5/165* | (2020.01) |
| *B25J 13/08* | (2006.01) |

(52) U.S. Cl.
CPC ............ *G01L 1/142* (2013.01); *B25J 13/085* (2013.01); *G01L 5/165* (2013.01)

(58) Field of Classification Search
CPC ......... G01L 1/142; G01L 5/165; B25J 13/085
USPC ..................................................... 73/862.337
See application file for complete search history.

(56) References Cited

U.S. PATENT DOCUMENTS

| | | | |
|---|---|---|---|
| 2002/0014126 A1* | 2/2002 | Okada ................... | B81B 3/0021 73/862.043 |
| 2004/0055396 A1* | 3/2004 | Morimoto ............... | G01L 1/146 73/862.045 |
| 2007/0006668 A1* | 1/2007 | Hirabayashi ............. | G01L 1/26 73/862.541 |
| 2016/0290883 A1* | 10/2016 | Schumm ............. | B81C 1/00285 |

FOREIGN PATENT DOCUMENTS

| | | |
|---|---|---|
| JP | 05-215627 A | 8/1993 |
| JP | 2004-301731 A | 10/2004 |
| JP | 2007-10379 A | 1/2007 |

* cited by examiner

*Primary Examiner* — Max H Noori
(74) *Attorney, Agent, or Firm* — NSIP Law

(57) ABSTRACT

A force/torque sensor includes a ground unit having an internal space, a sensor unit positioned within the internal space and including a plurality of electrodes generating capacitances with the ground unit, and a support unit combined with a portion of the ground unit and supporting the sensor unit.

19 Claims, 17 Drawing Sheets

| Cell<br>F/T | 1 | 2 | 3 | 4 | 5 | 6 | 7 | 8 |
|---|---|---|---|---|---|---|---|---|
| $F_X$ | ↑ | ↑ | - | - | ↓ | ↓ | - | - |
| $F_Y$ | - | - | ↑ | ↑ | - | - | ↓ | ↓ |
| $F_Z$ | ↑ | ↑ | ↑ | ↑ | ↑ | ↑ | ↑ | ↑ |
| $T_X$ | ↓ | ↑ | - | - | ↑ | ↓ | - | - |
| $T_Y$ | - | - | ↓ | ↑ | - | - | ↑ | ↓ |
| $T_Z$ | ↑ | ↓ | ↑ | ↓ | ↑ | ↓ | ↑ | ↓ |

FIG. 12
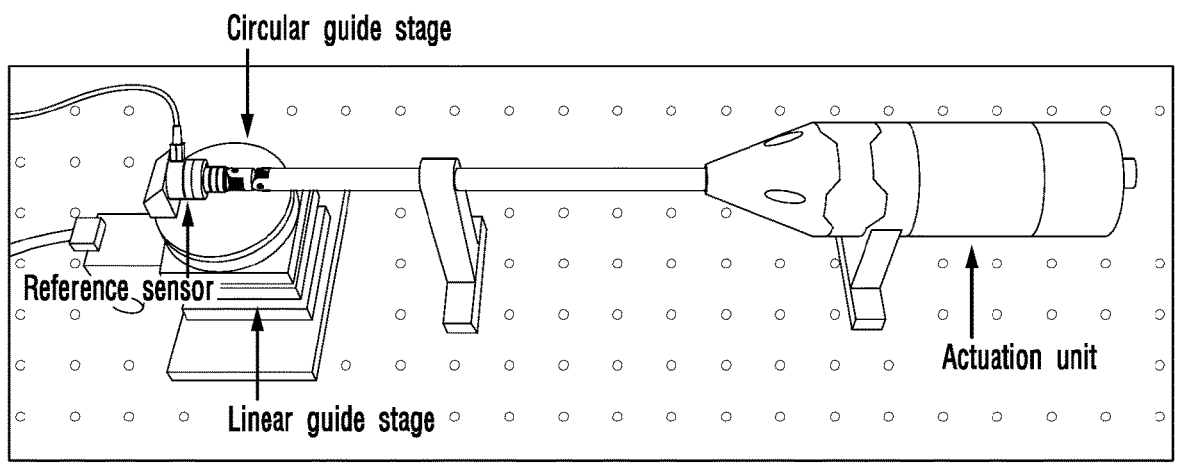
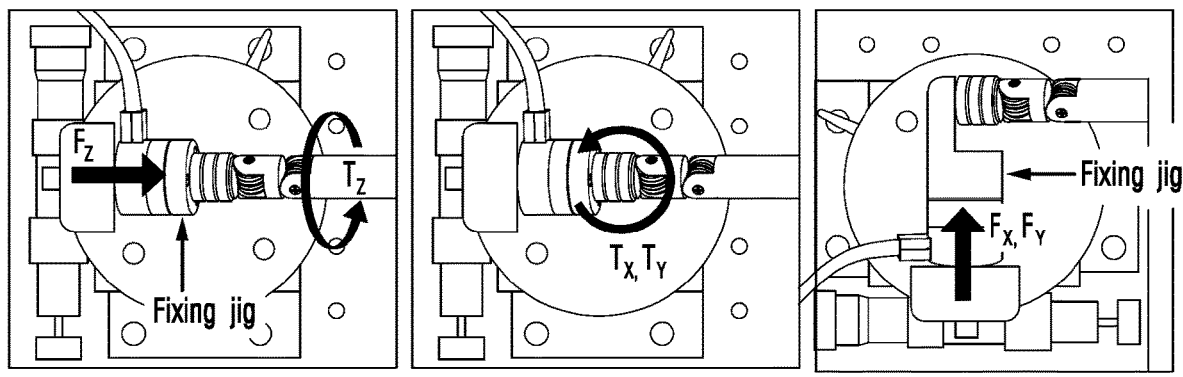

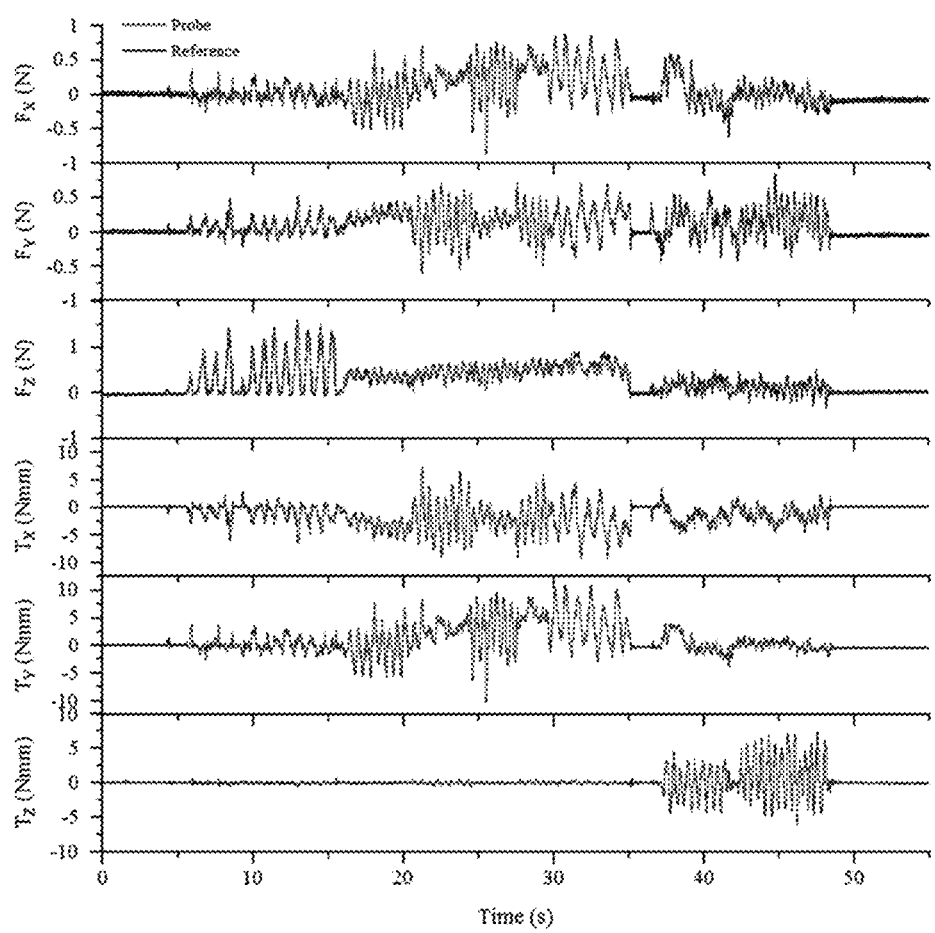

FORCE/TORQUE SENSOR THAT MINIATURIZATION IS AVAILABLE

CROSS-REFERENCE TO RELATED APPLICATION

This application claims priority to and the benefit of Korean Patent Application No. 10-2017-0033296 filed on Mar. 16, 2017 in the Korean Intellectual Property Office, and all the benefits accruing therefrom under 35 U.S.C. 119, the contents of which in its entirety are herein incorporated by reference.

BACKGROUND

1. Field

The following description relates to a force/torque sensor, and more particularly, to a force/torque sensor configured to be reduced in size.

2. Description of the Related Art

Most of existing force/torque sensors are resistive type sensors using a strain gauge.

In the resistive type sensor using a strain gauge, however, the strain gauge should be separately attached to the sensor, which is, however, quite a complicated work, making it difficult to achieve automation. Therefore, the resistive type sensor is not suitable for mass production and is not cost-effective. In addition, the resistive type sensor has a drawback in that it is quite vulnerable to external impacts.

To solve the problems with the resistive type sensor, capacitive force/torque sensors that measure force and torque using a variation in capacitance have been developed.

However, the capacitive force/torque sensors which have been developed to date still have several problems. That is to say, since the capacitive force/torque sensor has a complex structure and requires a high degree of accuracy in an assembling work, it is difficult to achieve miniaturization. Additionally, as the capacitive force/torque sensor is further reduced in size, the measurement sensitivity may be undesirably lowered. Thus, it is not possible to reduce the size of the capacitive force/torque sensor so as to be used in a state in which the capacitive force/torque sensor is attached to a joint or a terminal part of a humanoid robot.

SUMMARY

Therefore, an object of the present disclosure is to provide a capacitive force/torque sensor.

Another object of the present disclosure is to provide a force/torque sensor which enables miniaturization.

Another object of the present disclosure is to provide a force/torque sensor which has a simple configuration and can be easily assembled.

Another object of the present disclosure is to provide a force/torque sensor which is capable of easily detecting even small magnitudes of force/torque.

The above and other objects will be all accomplished by a force/torque sensor according to the present disclosure.

According to an aspect of the present disclosure, there is provided a force/torque sensor including a ground unit, a sensor unit and a support unit.

The ground unit may include a sensing part, a base part, and a deformable part connecting the sensing part and the base part and elastically deformed, and may have an internal space extending to a portion of the sensing part while passing through the base part and the deformable part.

The sensor unit may be positioned within the internal space corresponding to the sensing part, and may include a plurality of electrodes generating capacitances with the ground unit.

The support unit may be combined with the base part and may support the sensor unit.

The support unit may have a through-hole to allow a portion of the sensor unit to communicate with the outside of the ground unit.

The deformable part may be formed by cutting out a portion of a side surface of the ground unit.

The support unit may include a first part combined with the base part and a second part connecting the first part and the sensor unit.

Here, the first part may have a sectional area corresponding to the internal space of the base part such that the first part may be fitted into the internal space in a widthwise direction of the ground unit, and the sensor unit may have a smaller sectional area than the first part to be spaced apart from the ground unit in the width direction.

In addition, the second part may have a smaller sectional area than the first part in the widthwise direction, and the sensor unit may have a length enough to be spaced apart from the ground unit in a lengthwise direction of the ground unit in a state in which the first part is fitted into the base part.

The plurality of electrodes may be rectangular electrodes, and capacitances may be generated between top surface of each rectangular electrode and the sensing part, and between at least one side surface of each rectangular electrode and the sensing part.

The sensor unit may include eight (8) electrodes, each two of which are positioned at four corners of an imaginary rectangle, and the eight electrodes are symmetrical with respect to X- and Y-axis passing the center of the four corners.

Assuming that capacitances generated between the eight electrodes and the sensing part are denoted by first to eighth capacitances in a clockwise/counter-clockwise direction, the first to eighth capacitances may be varied according to 3-axis force/torque as follows.

When a force in a X-axis direction is exerted, the first and second capacitances may be decreased, the fifth and sixth capacitances may be increased, and the third, fourth, seventh and eighth capacitances may not be changed.

When a force in a Y-axis direction is exerted, the third and fourth capacitances may be increased, the seventh and eighth capacitances may be decreased, and the first, second, fifth and sixth capacitances may not be changed.

When a force in a Z-axis direction perpendicular to the X- and Y axis is exerted, the first to eighth capacitances may be increased.

When a torque in the X-axis direction is exerted, one of the first and second capacitances may be increased while the other is decreased, one of the fifth and sixth capacitances may be increased while the other is decreased, and the third, fourth, seventh and eighth capacitances may not be changed.

When a torque in the Y-axis direction is exerted, one of the third and fourth capacitances may be increased while the other is decreased, one of the seventh and eighth capacitances may be increased while the other is decreased, and the first, second, fifth and sixth capacitances may not be changed.

When a torque in the Z-axis direction is exerted, one of the first and second capacitances may be increased while the other is decreased, one of the third and fourth capacitances may be increased while the other is decreased, one of the fifth and sixth capacitances may be increased while the other is decreased, and one of the seventh and eighth capacitances may be increased while the other is decreased.

The sensor unit may include a rectangular substrate having the plurality of electrodes formed thereon, and the internal space corresponding to the sensing part may be a hexahedral space separated from the rectangular substrate by a predetermined distance.

Here, regions adjacent to vertices of the rectangular substrate may be removed.

According to another aspect of the present disclosure, there is provided a force/torque sensor including a ground unit having an internal space, and a sensor unit positioned within the internal space and including an electrode generating capacitance with the ground unit, wherein the capacitance is varied depending on a change in the distance between the ground unit and the electrode regardless of a direction in which force/torque are exerted.

The sensor unit may include eight electrodes, each two of which are positioned at four corners of an imaginary rectangle so as to be symmetrical with respect to X- and Y-axis passing the center of the four corners.

Each of the eight electrodes may be disposed such that a top surface and a portion of a side surface face the ground unit.

The internal space may be a hexahedral space, and the electrodes may be rectangular electrodes each having at least one side surface facing the ground unit.

The substrate may be a rectangular substrate, and each two of the electrodes may be positioned at four sides of the substrate.

When an external force/torque is not exerted on the force/torque sensor, the eight electrodes and the hexahedral space are in the following relationships.

The first and second electrodes among the eight electrodes, which are positioned closest to a first side surface of the hexahedral space, may be equally spaced apart from the first side surface.

The third and fourth electrodes among the eight electrodes, which are positioned closest to a second side surface of the hexahedral space, may be equally spaced apart from the second side surface.

The fifth and sixth electrodes among the eight electrodes, which are positioned closest to a third side surface opposite to the first side surface of the hexahedral space, may be equally spaced apart from the third side surface.

The seventh and eighth electrodes among the eight electrodes, which are positioned closest to a fourth side surface opposite to the second side surface of the hexahedral space, may be equally spaced apart from the fourth side surface.

The first to eighth electrodes may be equally spaced apart from a top surface of the hexahedral space.

Assuming that capacitances generated between the eight electrodes and the ground unit are denoted by first to eighth capacitances, the first to eighth capacitances may be varied according to 6-axis force/torque as follows.

When a force in the X-axis direction is exerted, the first and second capacitances may be decreased, the fifth and sixth capacitances may be increased, and the third, fourth, seventh and eighth capacitances may not be changed.

When a force in the Y-axis direction is exerted, the third and fourth capacitances may be increased, the seventh and eighth capacitances may be decreased, and the first, second, fifth and sixth capacitances may not be changed.

When a force in the Z-axis direction perpendicular to the X- and Y axis is exerted, the first to eighth capacitances may be increased.

When a torque in the X-axis direction is exerted, one of the first and second capacitances may be increased while the other is decreased, one of the fifth and sixth capacitances may be increased while the other is decreased, and the third, fourth, seventh and eighth capacitances may not be changed.

When a torque in the Y-axis direction is exerted, one of the third and fourth capacitances may be increased while the other is decreased, one of the seventh and eighth capacitances may be increased while the other is decreased, and the first, second, fifth and sixth capacitances may not be changed.

When a torque in the Z-axis direction is exerted, one of the first and second capacitances may be increased while the other is decreased, one of the third and fourth capacitances may be increased while the other is decreased, one of the fifth and sixth capacitances may be increased while the other is decreased, one of the seventh and eighth capacitances may be increased while the other is decreased.

As described above, according to the present disclosure, a force/torque sensor, which has a simple configuration and is easily assembled, can easily achieve miniaturization. In particular, since the force/torque sensor is capable of easily detecting even small magnitudes of force/torque, a force/torque sensor enabling miniaturization can be provided.

BRIEF DESCRIPTION OF THE DRAWINGS

FIG. 12 illustrates an experiment in which 6-axis force/torque are exerted on a minimum-invasive surgery instrument illustrated in FIG. 11.

FIG. 20 is a graph showing results of the experiment shown in FIG. 19.

DETAILED DESCRIPTION

Figure 1:
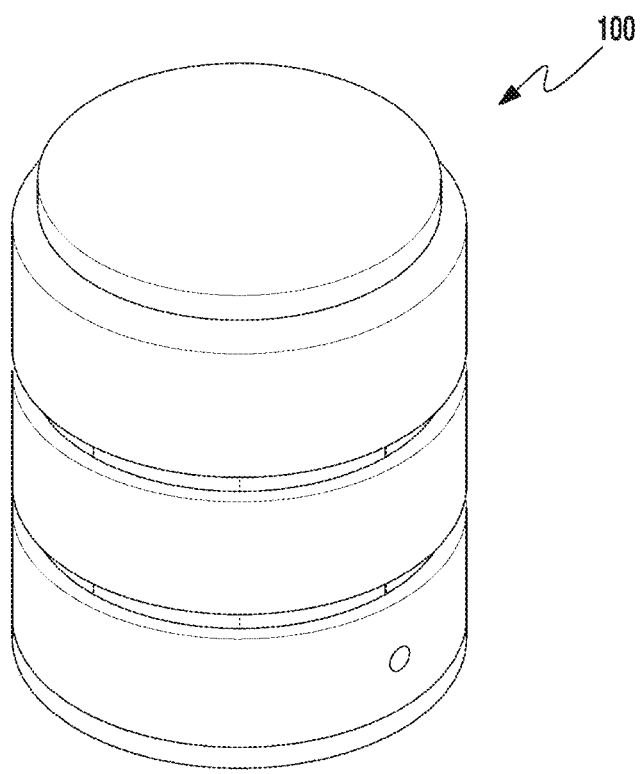
FIG. 1 is a perspective view of a force/torque sensor according to an embodiment of the present disclosure.

Hereinafter, a force/torque sensor according to the present disclosure will be described in detail with reference to the accompanying drawings.

In the following description, only a portion required in understanding a force/torque sensor according to an embodiment of the present disclosure will be provided, and the explanation of other portions will be omitted in order not to confuse the gist of the present disclosure.

Furthermore, unless defined otherwise, all the terms used in this specification including technical and scientific terms would be generally understood by those skilled in the related art. The terms defined in generally used dictionaries should be construed as having the same meanings as those construed in the context of the related art, and unless clearly defined otherwise in this specification, should not be construed as having idealistic or overly formal meanings.

Throughout the specification of the present disclosure, when a component is referred to as "comprises" other elements, it is intended to mean that the component further comprises other elements, but do not exclude other elements, unless otherwise specified.

The same or corresponding functional components in various embodiments will be denoted by the same reference numeral and representatively described through a specific exemplary embodiment, and functional components different from those of the specific embodiment will be described in the other embodiments.

Figure 2:
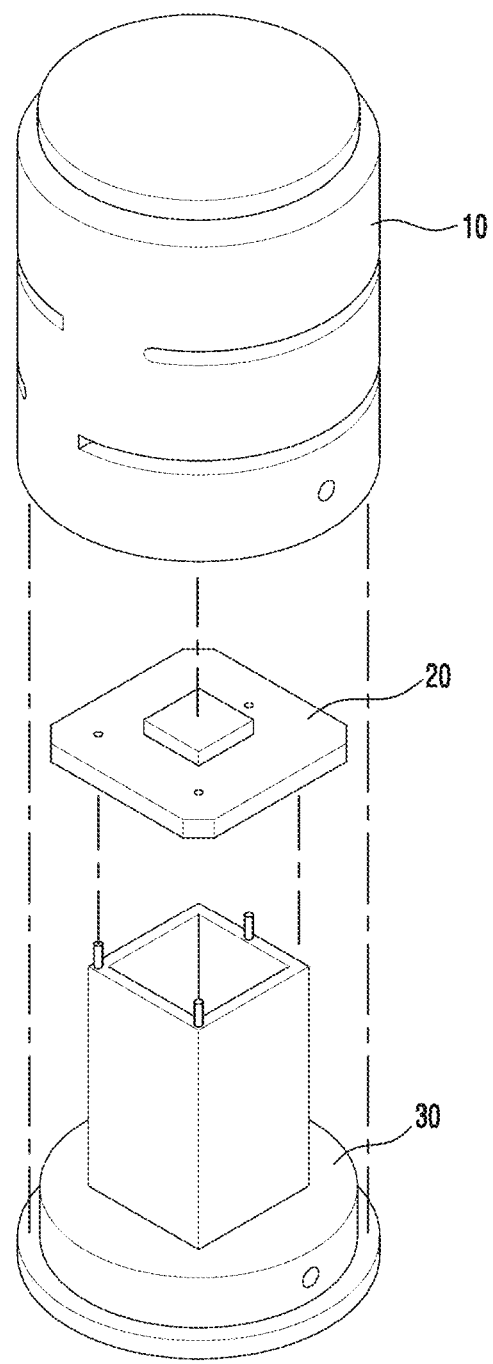
FIG. 2 is an exploded perspective view of the force/torque sensor according to an embodiment of the present disclosure.

FIG. 1 is a perspective view of a force/torque sensor according to an embodiment of the present disclosure, and FIG. 2 is an exploded perspective view of the force/torque sensor according to an embodiment of the present disclosure.

As illustrated in FIGS. 1 and 2, the force/torque sensor 100 according to an embodiment of the present disclosure may include a ground unit 10, a sensor unit 20, and a support unit 30.

The ground unit 10 generates capacitance with the sensor unit 20.

Figure 3:
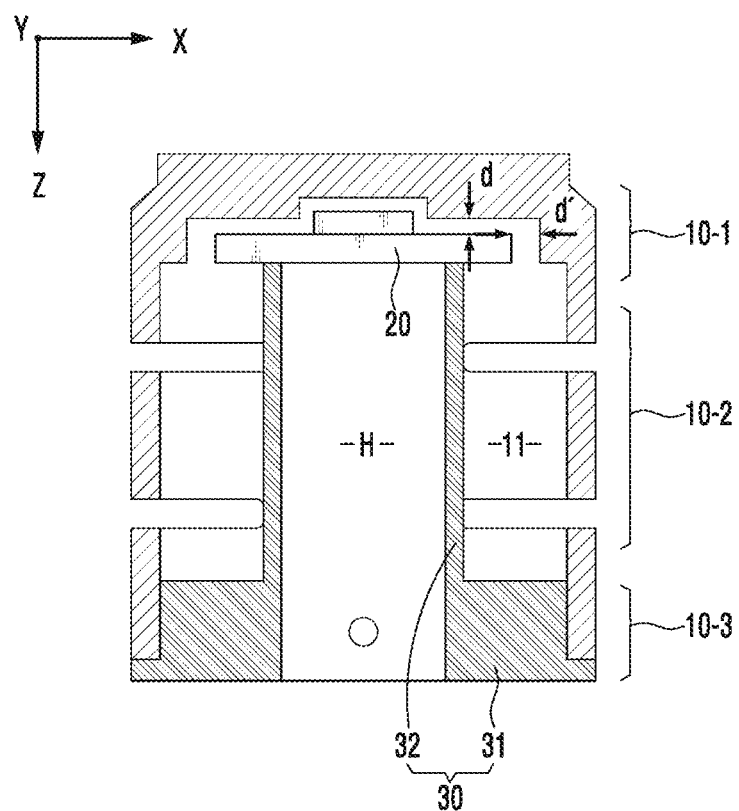
FIG. 3 is a cross-sectional view of the force/torque sensor according to an embodiment of the present disclosure.

In order to generate capacitance between the ground unit 10 and the sensor unit 20, as illustrated in FIG. 3, the ground unit 10 is spaced apart from the sensor unit 20 and has a different electric potential from the sensor unit 20.

In order to make a potential difference between the ground unit 10 and the sensor unit 20, an appropriate amount of power can be supplied to the ground unit 10. However, the ground unit 10 is preferably grounded to make the potential difference between the ground unit 10 and the sensor unit 20.

In addition, when external force/torque are exerted, the ground unit 10 moves relative to the sensor unit 20, thereby causing a variation in capacitance between the sensor unit 20 and the ground unit 10. The force/torque sensor according to an embodiment of the present disclosure is capable of detecting the external force/torque using the variation in capacitance between the sensor unit 20 and the ground unit 10.

A configuration of the ground unit 10 with relative movement with respect to the sensor unit 20 will now be described in more detail with reference to FIG. 3 illustrating a cross-sectional view of the force/torque sensor according to an embodiment of the present disclosure.

As illustrated in FIG. 3, the ground unit 10 includes a sensing part 10-1, a deformable part 10-2, and a base part 10-3, and has an internal space 11 extending to a portion of the sensing part 10-1 while passing through the base part 10-3 and the deformable part 10-2.

The sensing part 10-1 is an area where capacitance is generated in cooperation with the sensor unit 20, and has a different electric potential from the sensor unit 20.

The sensor unit 20 is positioned within the internal space 11 corresponding to the sensing part 10-1, and capacitance is generated between the sensing part 10-1 and the sensor unit 20. As the sensing part 10-1 is shifted in position relative to the sensor unit 20 according to external force/torque exerted, the capacitance may be varied.

The deformable part 10-2 is deformed when a force or torque is exerted on the ground unit 10, and is elastically deformable to then return to its initial position when the force or torque is removed.

The deformable part 10-2 may be formed simply by cutting out a portion of a side surface of the ground unit 10.

Figure 4:
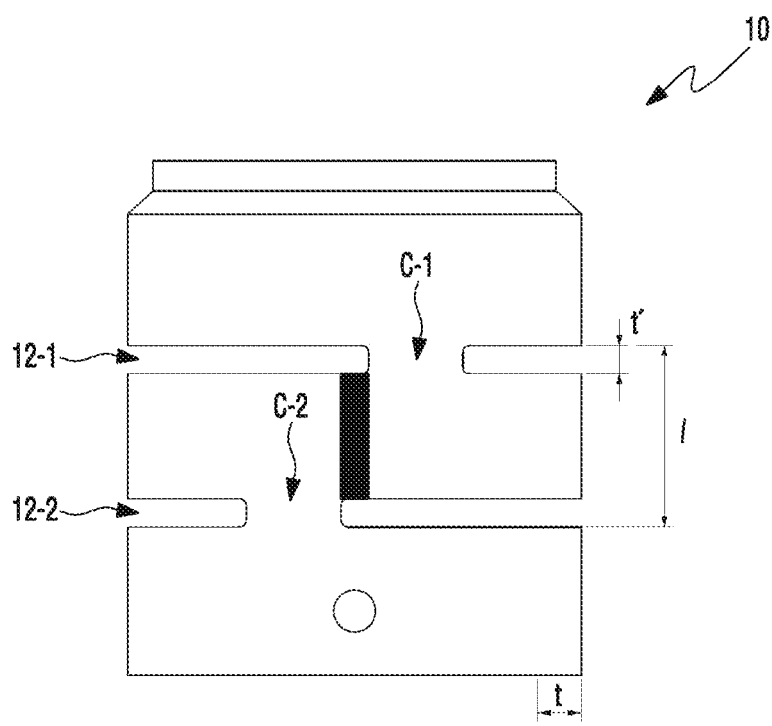
FIG. 4 illustrates a ground portion of the force/torque sensor according to an embodiment of the present disclosure.

In more detail, as illustrated in FIG. 4, two or more cut-out portions 12-1 and 12-2 having a C-letter shape are formed on the side surface of the ground unit 10 in a direction crossing the Z axis, and connecting portions C-1 and C-2 remaining without being cut out by the C-letter shaped cut-out portions 12-1 and 12-2 are disposed so as not to overlap each other on a X-Y plane, thereby forming the deformable part capable of achieving appropriate elastic deformation.

Here, the extent of elastic deformation of the deformable part 10-2 can be controlled by adjusting numbers, heights (t') and lengths of the cut-out portions 12-1 and 12-2, distances (l) between each of a plurality of cut-out portions, or a thickness (t) of the ground unit 10.

The deformable part 10-2, which enables appropriate elastic deformation, may also be formed by forming continuous spiral cut-out parts on a side surface of the ground unit 10.

Since the sensing part 10-1 and the base part 10-3 are connected to each other by the deformable part 10-2, the sensing part 10-1 is shifted in position relative to the base part 10-3 when a force or torque is exerted on the ground unit 10.

In addition, as illustrated in FIG. 3, since the sensor unit 20 is connected to the base part 10-3 by the support unit 30, the sensing part 10-1 is shifted in position relative to the sensor unit 20 when force/torque are exerted on the ground unit 10, so that capacitance between the sensor unit 20 and the sensing part 10-1 may also be varied.

A configuration of the support unit 30 connecting the sensor unit 20 to the base part 10-3 will now be described in more detail.

The support unit 30 is a component for supporting the sensor unit 20.

In order to support the sensor unit 20 spaced apart from the sensing part 10-1 within the internal space, the support unit 30 may have one side combined with the sensor unit 20 and the other side combined with the base part 10-3.

In more detail, the support unit 30 may include a first part 31 combined with the base part 10-3, and a second part 32 connecting the first part 31 to the sensor unit 20.

The first part 31 has a sectional area (an area of a section orthogonal to the Z axis in FIG. 3) shaped to conform to the internal space 11 of the ground unit 10 corresponding to the base part 10-3, so that it can be fitted into the internal space 11 of the ground unit 10, as illustrated in FIG. 3. Here, in order to tightly coupling the first part 31 to the base part 10-3, a coupling member, such as a fixing screw, can be used.

The second part 32 is positioned in the internal space 11 of the ground unit 10 corresponding to the deformable part 10-2 and the second part connects the first part 31 to the sensor unit 20. The second part 32 preferably has a smaller sectional area than the internal space 11 of the ground unit 10 to prevent the deformable part 10-2 from being restricted in elastic movement.

In addition, the second part 32 is formed to have a length enough to allow the sensor unit 20 combined with the support unit 30 and positioned in the internal space 11 of the ground unit 10 to be spaced a predetermined distance d apart from the sensing part 10-1 in the Z-axis direction shown in FIG. 3.

The sensor unit 20 also preferably has a smaller sectional area than the internal space 11 of the sensing part 10-1 to be spaced a predetermined distance d' apart from the sensing part 10-1 in the X- and Y-axis directions shown in FIG. 3.

In addition, the support unit 30 has a through-hole H passing through the inside of the support unit 30 in the Z-axis direction shown in FIG. 3.

As illustrated in FIG. 3, a portion of the sensor unit 20 can communicate with the outside of the ground unit 10 by the through-hole H. Therefore, a power cable for supplying power to the sensor unit 20 and signal lines for outputting signals to the outside from the sensor unit 20, can be easily connected to the sensor unit 20 through the through-hole H.

As described above, since the force/torque sensor 100 according to an embodiment of the present disclosure includes the ground unit 10, the sensor unit 20 and the support unit 30, which have simplified configurations, it is quite advantage for achieving miniaturization.

In addition, after the sensor unit 20 and the support unit 30 are combined with each other and then inserted into the internal space 11 of the ground unit 10, the support unit 30 is combined with the base part 10-3 of the ground unit 10, which is quite a simple process, thereby completing an assembling work of the force/torque sensor.

In addition, the force/torque sensor 100 according to an embodiment of the present disclosure is configured such that the sensor unit 20 is positioned within the internal space 11 formed by the ground unit 10, thereby attaining a high degree of sensitivity even if the force/torque sensor 100 is reduced in size.

The present disclosure will now be in greater detail. The capacitance C generated between two facing electrodes is calculated according to Formula below:

$$C = \varepsilon \frac{A}{d}$$

where d is a distance between the two electrodes, and A is a facing area of the two electrodes.

Figure 5:
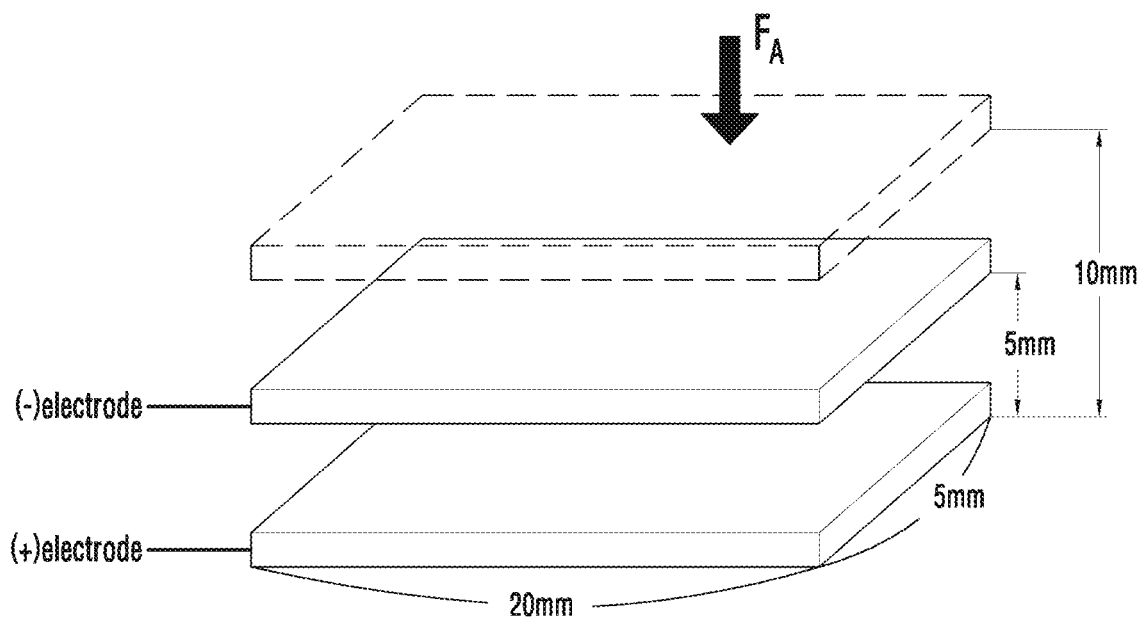
FIG. 5 illustrates capacitance variations when a force perpendicular to electrodes is exerted on the electrodes.

Here, as illustrated in FIG. 5, in a state in which two electrodes having an area of 100 square millimeters are spaced 10 mm apart from each other, when a force ($F_A$) perpendicular to the electrodes is exerted to move the (−) electrode by 5 mm, the capacitance C is twice as much as the force ($F_A$) has yet to be exerted (an increase of 200%).

Figure 6:
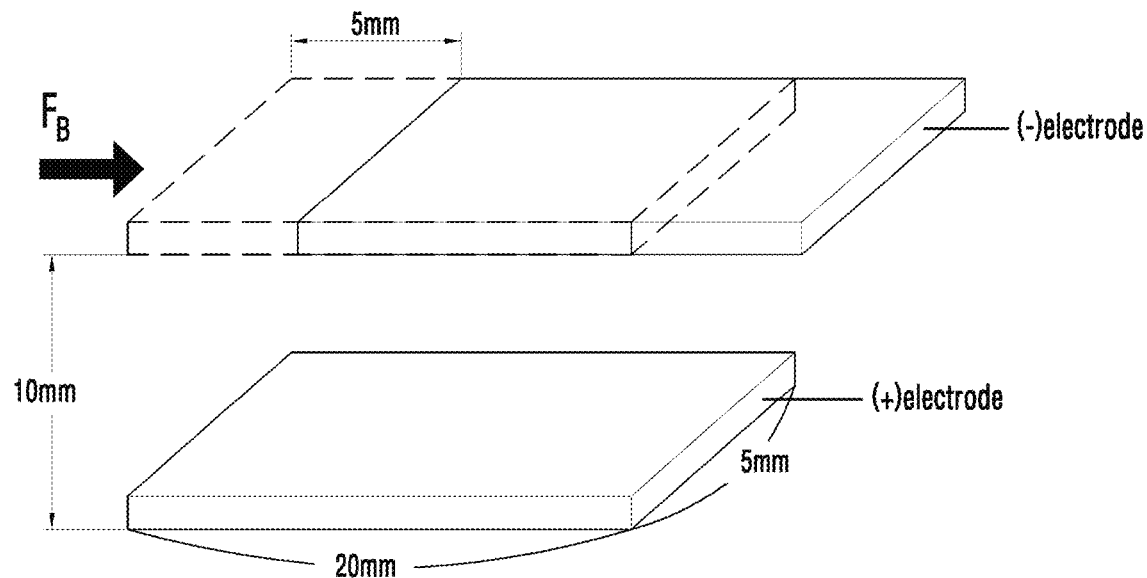
FIG. 6 illustrates capacitance variations when a force parallel with electrodes is exerted on the electrodes.

However, as illustrated in FIG. 6, when a force ($F_B$) parallel with the electrodes is exerted to move the (−) electrode by 5 mm, the capacitance C is 25% less than the force ($F_B$) has yet to be exerted.

That is to say, it will be appreciated that the capacitance between two electrodes significantly depends on the distance between the two electrodes, rather than on the facing area of the two electrodes.

Accordingly, the force/torque sensor according to an embodiment of the present disclosure is configured such that the distance between two facing electrodes generating capacitance, that is, between the sensor unit 20 and the ground unit 10 is changed when the force/torque are exerted, regardless of a direction in which the force/torque are exerted.

Therefore, if the force/torque sensor is reduced in size so that the distance between two electrodes is changed within a restricted range, even a small change in the distance can bring about a significant variation in capacitance, thereby efficiently detecting a force/torque exerted on the force/torque sensor.

Hereinafter, a method of measuring a force/torque by the force/torque sensor 100 according to an embodiment of the present disclosure will be described in detail with a configuration of an example sensor unit constructing a 6-axis force/torque sensor capable of measuring both the force and the torque exerted in three directions.

However, it will be appreciated that the configuration of the sensor unit that will be described below is provided just by way of example for constructing an efficient 6-axis force/torque sensor, and that the force/torque sensor according to an embodiment of the present disclosure can be constructed in various types of force/torque sensors, including, for example, a 3-axis sensor, by varying configurations of the sensor unit.

Figure 7:
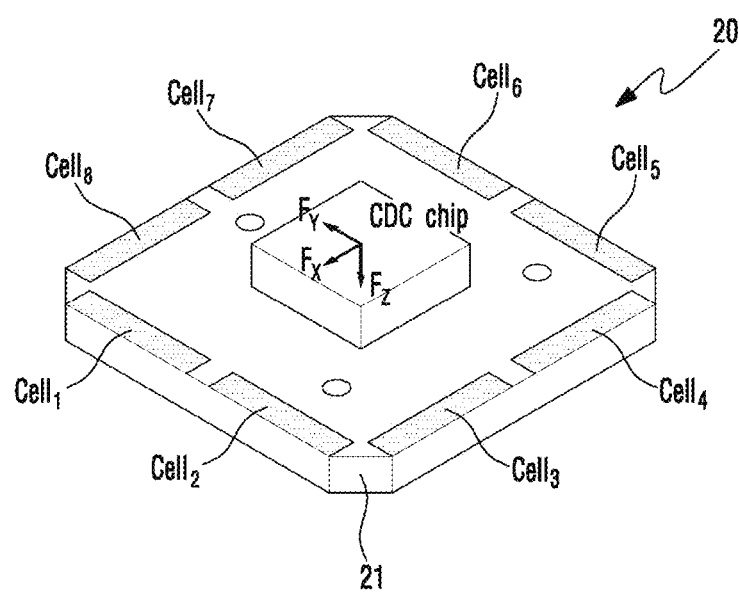
FIG. 7 illustrates an example of a sensor unit of the force/torque sensor according to an embodiment of the present disclosure.

FIG. 7 illustrates a configuration of an exemplary sensor unit for constructing the force/torque sensor 100 according to an embodiment of the present disclosure in the form of a 6-axis force/torque sensor.

As illustrated in FIG. 7, the sensor unit 20 may include a substrate 21 and a plurality of electrodes $Cell_1$ to $Cell_8$.

The substrate 21 may be a printed circuit board (PCB) on which circuits for supplying power to the respective electrodes and sensing capacitances derived from the respective electrodes are provided. As illustrated in FIG. 7, a capacitance-digital converter chip (CDC chip) for converting capacitances measured from the respective electrodes into digital signals may be provided on the substrate 21.

The plurality of electrodes may be arranged such that top surfaces and at least one side surface of the plurality of electrodes face the ground unit and thus capacitance is generated between the plurality of electrodes and the ground unit.

In addition, in order to easily detect the presence of 6-axis force/torque exerted, the plurality of electrodes are preferably rectangular electrodes.

In addition, the plurality of electrodes are also preferably film-type electrodes, as illustrated in FIG. 7. However, in order to generate large magnitudes of capacitances from side surfaces of the electrodes as well, block-type electrodes illustrated in FIG. 8 are more preferably used as the plurality of electrodes.

Figure 8:
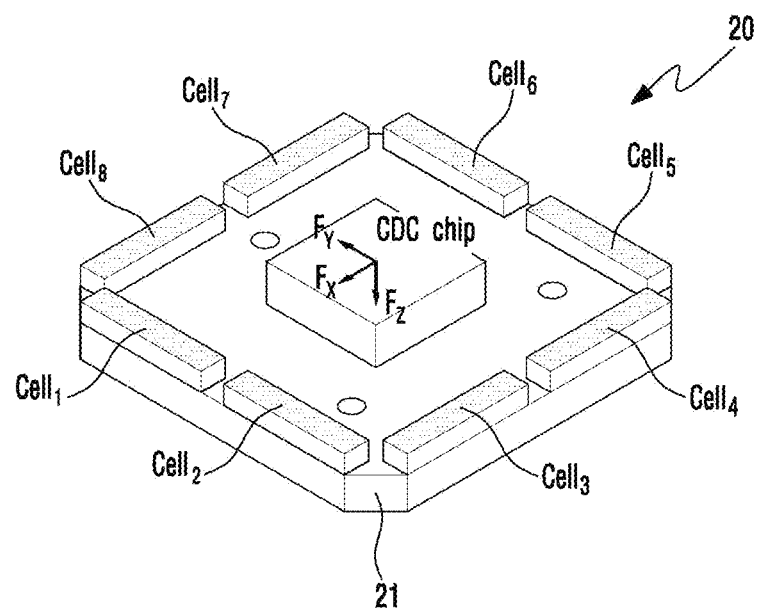
FIG. 8 illustrates another example of the sensor unit of the force/torque sensor according to an embodiment of the present disclosure.

In addition, in order to efficiently detect the presence of 6-axis force/torque exerted, the plurality of electrodes preferably include eight (8) electrodes, as illustrated in FIGS. 7 and 8.

Each two of the eight electrodes are arranged in a row, and a pair of electrodes arranged in a row are arranged in parallel with other pair of electrodes.

That is, as shown in FIGS. 7 and 8, the eight electrodes are located at edges of an imaginary square such that each two electrodes is located at each edge and the eight electrodes are symmetrically with respect to two axes (X-axis and Y-axis in FIGS) passing the center of the corners of the imaginary square and being perpendicular to each other.

While the substrate 21 shaped to conform to the imaginary rectangle is illustrated in FIGS. 7 and 8, the shape of the substrate 21 is not limited to the illustrated rectangular shape, and the positions of the plurality of electrodes are not limited to being positioned at the edges of the substrate.

However, in a case where the substrate 21 is shaped of a rectangle, when the ground unit 10 is rotated relative to the sensor unit 20 according to the torque exerted, regions adjacent to vertices of the rectangular substrate are preferably removed so as not to contact the ground unit 10, as illustrated in FIGS. 7 and 8.

The eight electrodes arranged in the above-described manner may be positioned in the internal space 11 of the ground unit 10 such that the top surfaces of the eight electrodes are spaced a predetermined distance d apart from the ground unit 10 and one side surface of each electrode is spaced a predetermined distance d' apart from the ground unit 10 as the result of assembling the ground unit 10, the sensor unit 20 and the support unit 30 (see FIG. 3).

In addition, in order to maintain distances between the electrodes and the ground unit 10, the internal space 11 of the ground unit 10 corresponding to the sensing part 10-1 may be formed as a hexahedral space in which the sensor unit 20 is positioned.

In the force/torque sensor according to an embodiment of the present disclosure having the aforementioned configuration, variations in capacitances generated between the eight electrodes and the ground unit when 6-axis force/torque are exerted will now be described with reference to FIGS. 8 and 9.

First, for the sake of brevity and clarity, the eight electrodes are referred to as a first electrode ($Cell_1$), a second electrode ($Cell_2$), a third electrode ($Cell_3$), a fourth electrode ($Cell_4$), a fifth electrode ($Cell_5$), a sixth electrode ($Cell_6$), a seventh electrode ($Cell_7$), and an eighth electrode ($Cell_8$), respectively.

When force/torque are not exerted on the force/torque sensor 100 according to an embodiment of the present disclosure, the respective electrodes are in the following states.

A top surface of the first electrode ($Cell_1$) is spaced a distance $d_1$ apart from the ground unit and a side surface thereof is spaced a distance $d'_1$ apart from the ground unit, and a capacitance C1 is generated between the first electrode and the ground unit.

A top surface of the second electrode ($Cell_2$) is spaced a distance $d_2$ apart from the ground unit and a side surface thereof is spaced a distance $d'_2$ apart from the ground unit, and a capacitance C2 is generated between the second electrode and the ground unit.

A top surface of the third electrode ($Cell_3$) is spaced a distance $d_3$ apart from the ground unit and a side surface thereof is spaced a distance $d'_3$ apart from the ground unit, and a capacitance C3 is generated between the third electrode and the ground unit.

A top surface of the fourth electrode ($Cell_4$) is spaced a distance $d_4$ apart from the ground unit and a side surface thereof is spaced a distance $d'_4$ apart from the ground unit, and a capacitance C4 is generated between the fourth electrode and the ground unit.

A top surface of the fifth electrode ($Cell_5$) is spaced a distance $d_5$ apart from the ground unit and a side surface thereof is spaced a distance $d'_5$ apart from the ground unit, and a capacitance C5 is generated between the fifth electrode and the ground unit.

A top surface of the sixth electrode ($Cell_6$) is spaced a distance $d_6$ apart from the ground unit and a side surface thereof is spaced a distance $d'_6$ apart from the ground unit, and a capacitance C6 is generated between the sixth electrode and the ground unit.

A top surface of the seventh electrode ($Cell_7$) is spaced a distance $d_7$ apart from the ground unit and a side surface thereof is spaced a distance $d'_7$ apart from the ground unit, and a capacitance C7 is generated between the seventh electrode and the ground unit.

A top surface of the eighth electrode ($Cell_8$) is spaced a distance $d_8$ apart from the ground unit and a side surface thereof is spaced a distance $d'_8$ apart from the ground unit, and a capacitance C8 is generated between the eighth electrode and the ground unit.

Figure 9:
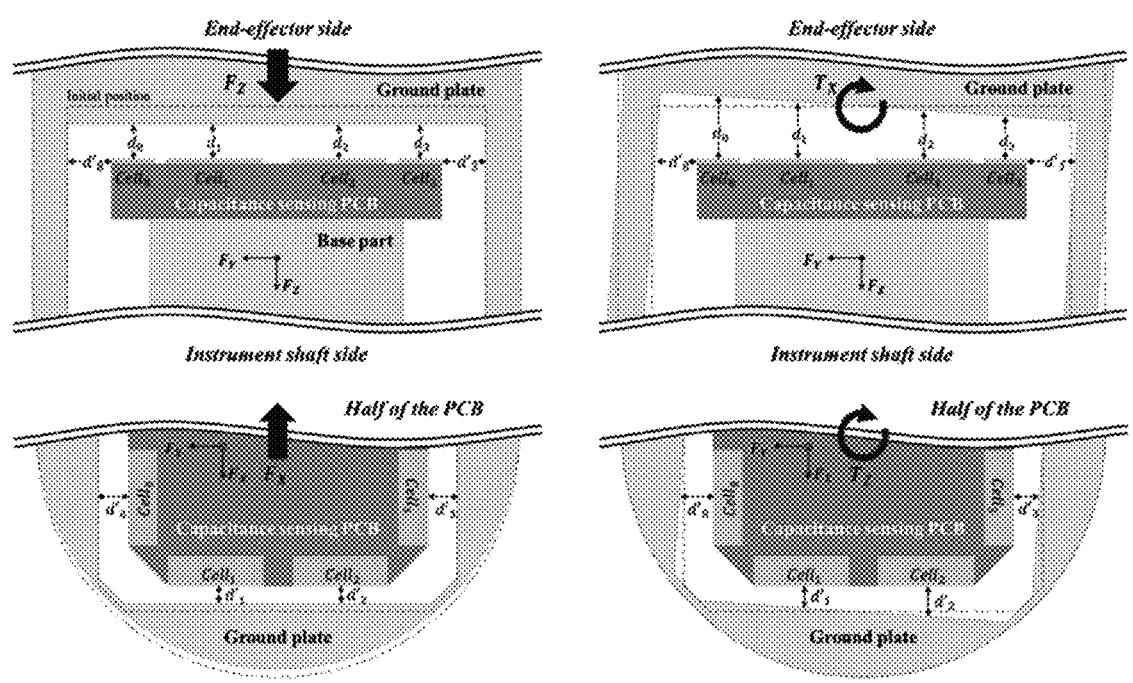
FIG. 9 illustrates positional changes between the sensor unit and the ground portion when force/torque are exerted on the force/torque sensor according to an embodiment of the present disclosure.
Figures 10, 11:
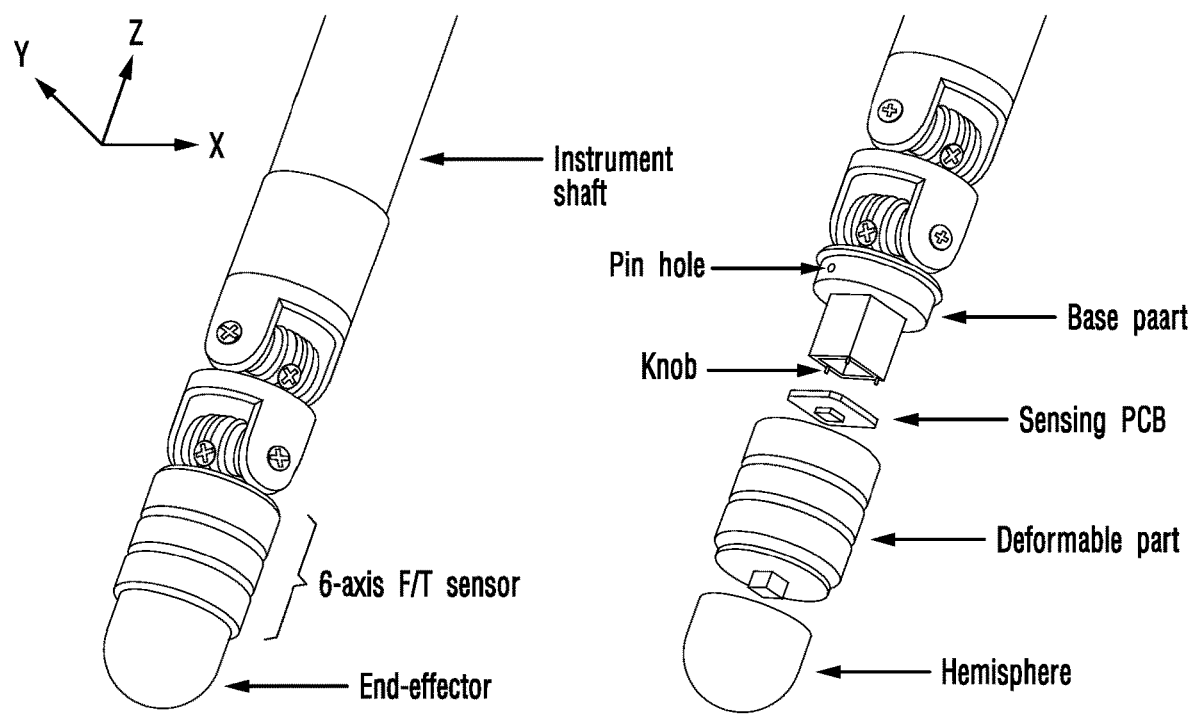
FIG. 10 is a table illustrating variations in capacitances measured from various cells of the force/torque sensor according to an embodiment of the present disclosure when force/torque are exerted.
FIG. 11 illustrates a minimum-invasive surgery instrument having to the force/torque sensor according to an embodiment of the present disclosure at the end of the instrument.
Figure 13:
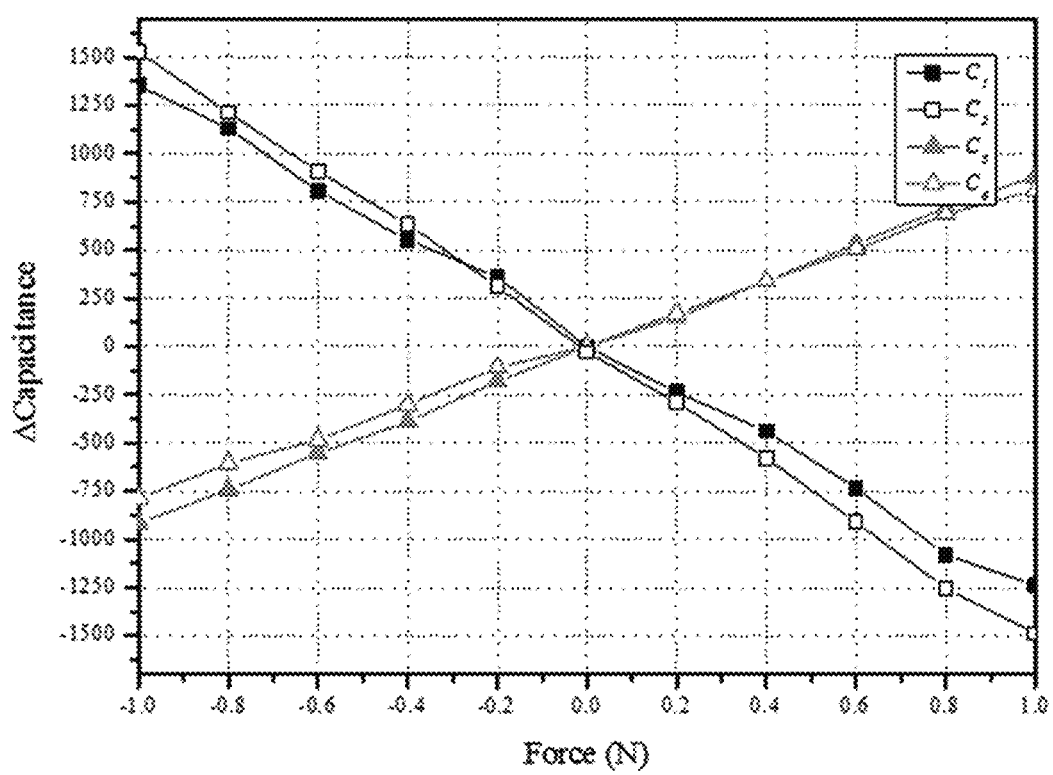
FIGS. 13 through 18 illustrate graphical representations of variations in capacitances measured from various sensing cells of the force/torque sensor according to an embodiment of the present disclosure when 6-axis force/torque are exerted.
Figure 14:
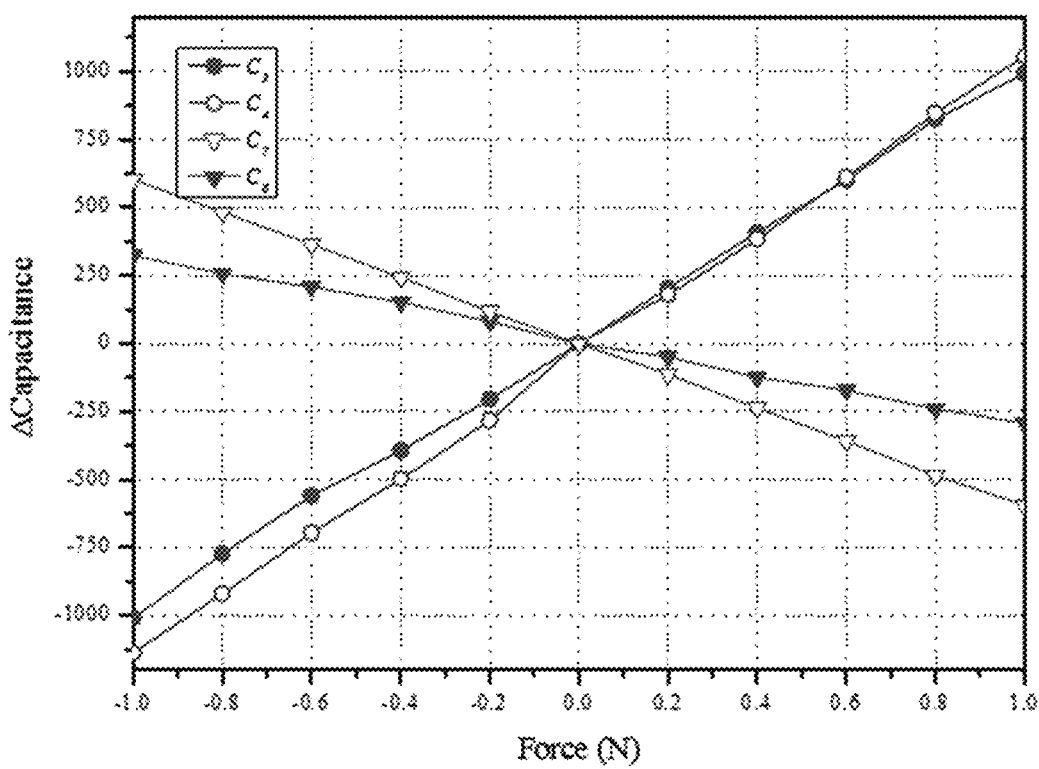
Figure 15:
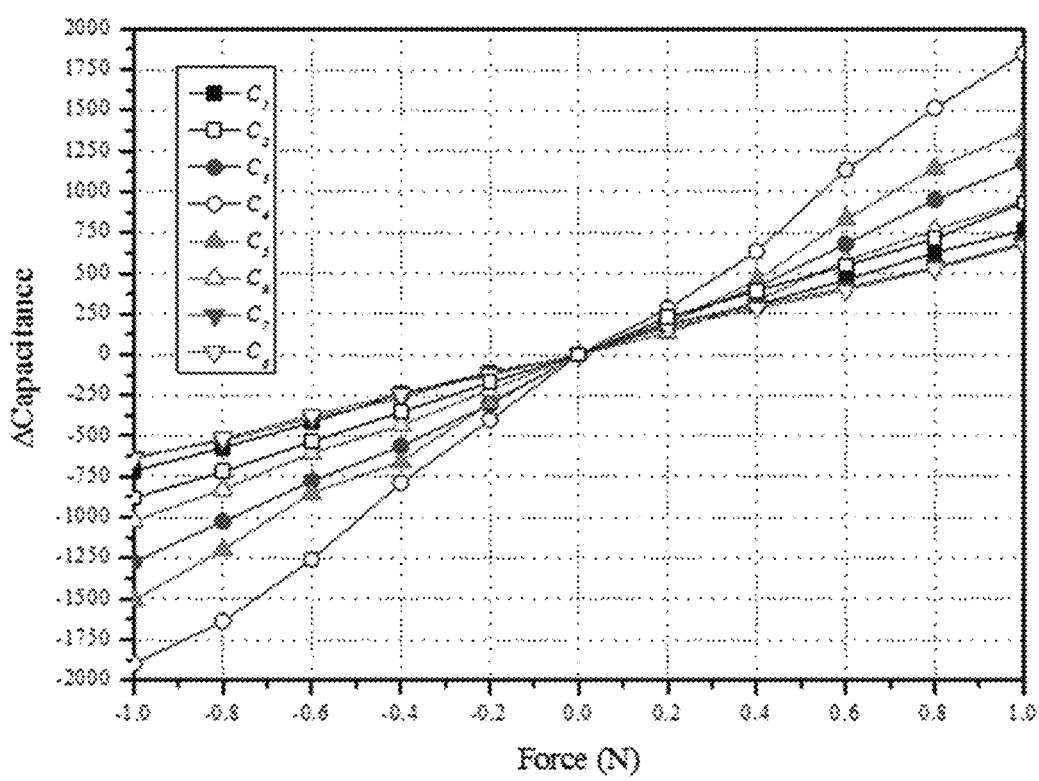
Figure 16:
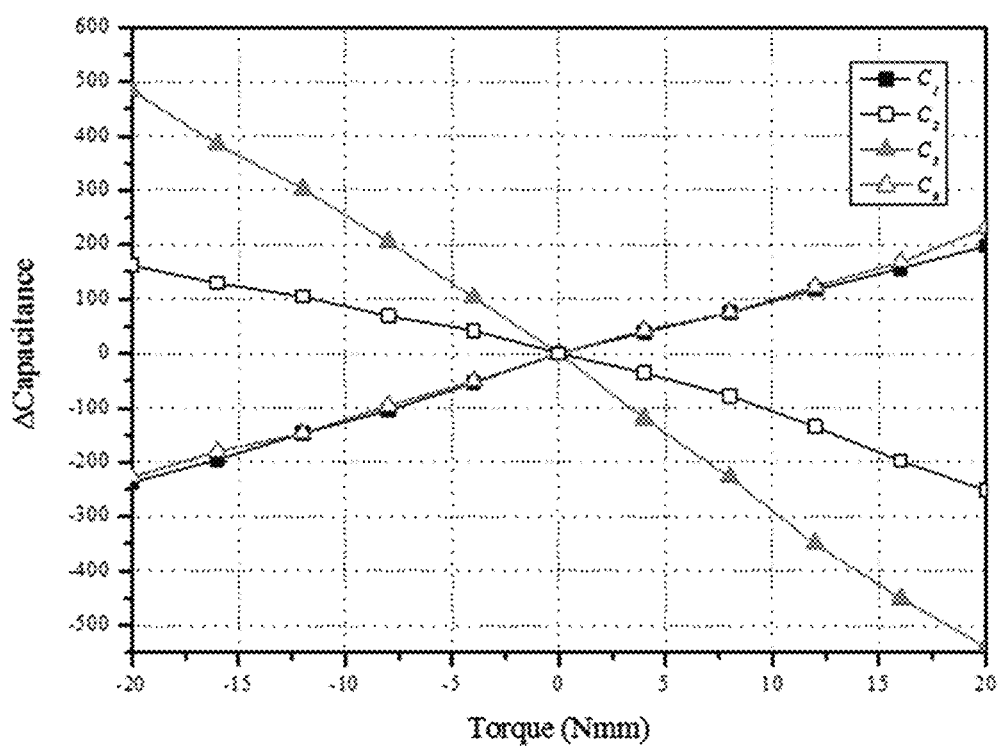
Figure 17:
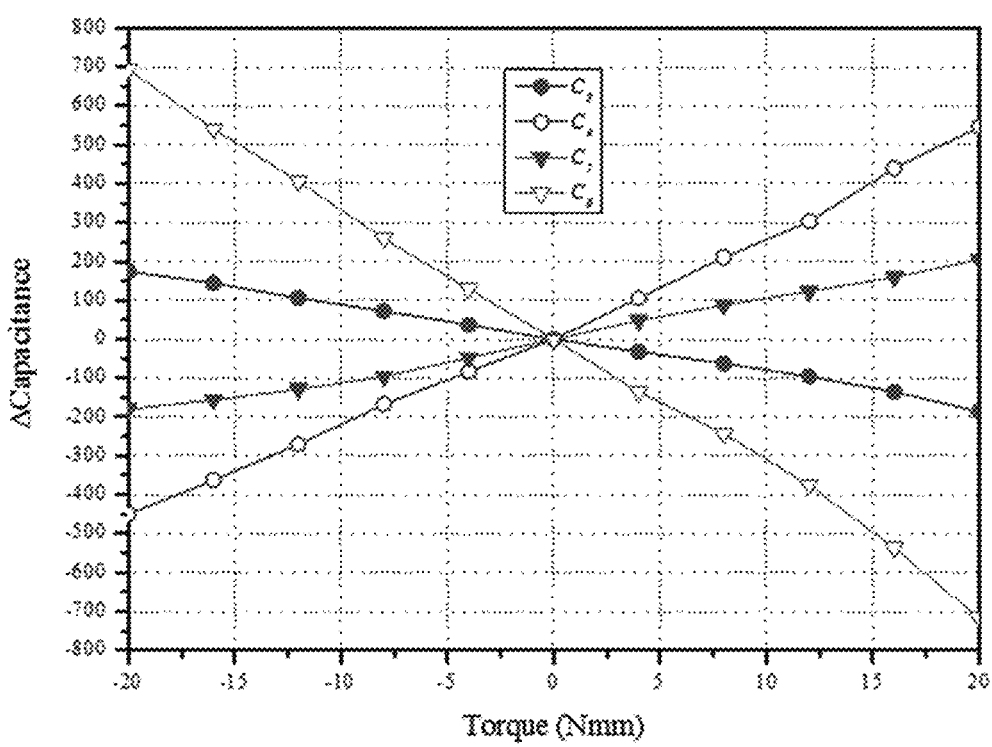
Figure 18:
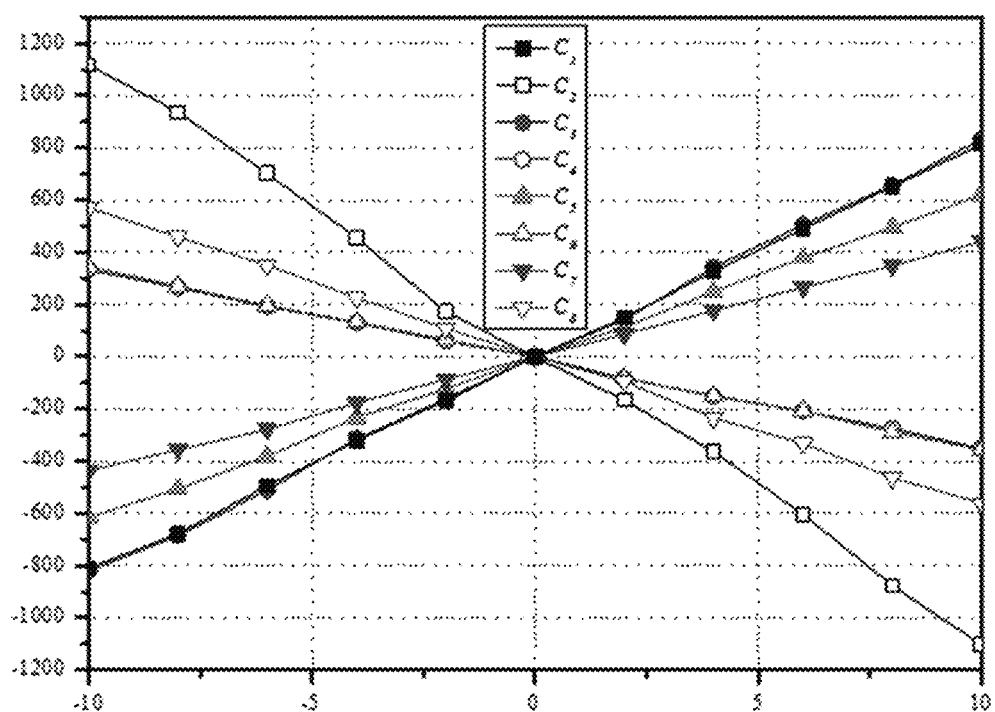

When a force ($F_z$) in the Z-axis direction is exerted on the force/torque sensor 100, as illustrated in FIG. 9, distances between the first to eighth electrodes and the ground unit are decreased while distances between side surfaces of the first to eighth electrodes and the ground unit are not changed. Therefore, as illustrated in FIG. 10, the capacitances C1 to C8 measured from the first to eighth electrodes are all increased, and it can be detected based on the capacitance variations that the force ($F_z$) in the Z-axis direction is exerted.

In addition, when a force ($F_X$) in the X-axis direction is exerted on the force/torque sensor 100, distances between the top surfaces of the first to eighth electrodes and the ground unit are not changed. However, as illustrated in FIG. 9, distances between side surfaces of the first and second electrodes and the ground unit are decreased, and distances between side surfaces of the fifth and sixth electrodes and the ground unit are increased. In addition, distances between side surfaces of the third, fourth, seventh and eighth electrodes and the ground unit are not changed. Therefore, as illustrated in FIG. 10, the capacitances C1 and C2 are increased, the capacitances C5 and C6 are decreased, and the capacitances C3, C4, C7 and C8 are not changed. Based on the capacitance variations, the force/torque sensor according to an embodiment of the present disclosure is capable of detecting that the force ($F_X$) in the X-axis direction is exerted thereon. Here, it will be understood that no change in the capacitances C3, C4, C7 and C8 comprises a case where variations of the capacitances C3, C4, C7 and C8 are negligibly small compared to variations of the capacitances C1, C2, C5 and C6.

Likewise, when a force ($F_Y$) in the Y-axis direction is exerted on the force/torque sensor 100, distances between the top surfaces of the first to eighth electrodes and the ground unit are not changed. However, distances between side surfaces of the third and fourth electrodes and the ground unit are decreased, and distances between the seventh and eighth electrodes and the ground unit are increased. In addition, distances between side surfaces of first, second, fifth and sixth electrodes and the ground unit are not changed. Therefore, as illustrated in FIG. 10, the capacitances C3 and C4 are increased, the capacitances C7 and C8 are decreased, and the capacitances C1, C2, C5 and C6 are not changed. Based on the capacitance variations, the force/torque sensor according to an embodiment of the present disclosure is capable of detecting that the force ($F_Y$) in the Y-axis direction is exerted thereon.

Next, when a torque ($T_Z$) in the Z-axis direction is exerted on the force/torque sensor 100, the distances between the top surfaces of the first to eighth electrodes and the ground unit are not changed. However, as illustrated in FIG. 9, the distances between the side surfaces of the first, third, fifth and seventh electrodes and the ground unit are decreased, and the distances between the side surfaces of the second, fourth, sixth and eighth electrodes and the ground unit are increased. Therefore, as illustrated in FIG. 10, the capacitances C1, C3, C5 and C7 are increased, and the capacitances C2, C4, C6 and C8 are decreased. Based on the capacitance variations, the force/torque sensor according to an embodiment of the present disclosure is capable of detecting that the torque ($T_z$) in the Z-axis direction is exerted thereon.

In addition, when a torque ($T_X$) in the X-axis direction is exerted on the force/torque sensor 100, as illustrated in FIG. 9, the distances between the side surfaces of the first, second, fifth and sixth electrodes and the ground unit are not changed. However, the distances between the top surfaces of the second and fifth electrodes and the ground unit are decreased, and the distances between the top surfaces of the first and sixth electrodes and the ground unit are increased, so that the capacitances C2 and C5 are increased, and the capacitances C1 and C6 are decreased. In addition, if the distances between the top surfaces of the other electrodes and the ground unit are increased, the distances between the side surfaces of the other electrodes and the ground unit are decreased, and if the distances between the top surfaces of the other electrodes and the ground unit are decreased, the distances between the side surfaces of the other electrodes and the ground unit are increased. Therefore, there are no variations in the capacitances of the other electrodes. Based on the capacitance variations, the force/torque sensor according to an embodiment of the present disclosure is capable of detecting that the torque ($T_x$) in the X-axis direction is exerted thereon.

Likewise, when a torque ($T_Y$) in the Y-axis direction is exerted on the force/torque sensor 100, the distances between the side surfaces of the third, fourth, seventh and eighth electrodes and the ground unit are not changed. However, the distances between the top surfaces of the fourth and seventh electrodes and the ground unit are decreased, and the distances between the top surfaces of the third and eighth electrodes and the ground unit are increased, so that the capacitances C4 and C7 are increased and the capacitances C3 and C8 are decreased. In addition, if the distances between the top surfaces of the other electrodes and the ground unit are increased, the distances between the side surfaces of the other electrodes and the ground unit are decreased, and if the distances between the top surfaces of the other electrodes and the ground unit are decreased, the distances between the side surfaces of the other electrodes and the ground unit are increased. Therefore, there are no variations in the capacitances of the other electrodes. Based on the capacitance variations, the force/torque sensor according to an embodiment of the present disclosure is capable of detecting that the torque ($T_Y$) in the Y-axis direction is exerted thereon.

In a case where capacitance variations contrary to the capacitance variations shown in FIG. 10 are made, it will be understood that force and/or torque in opposite directions with respect to the aforementioned directions of the force/torque are exerted on the force/torque sensor. That is to say, when the capacitances C5 and C6 are increased, the capacitances C1 and C2 are decreased, and the capacitances C3, C4, C7 and C8 are not changed, it will be understood that a force $-F_X$ (opposite to the force $F_X$ in direction) is exerted on the force/torque sensor.

As described above, the force/torque sensor according to an embodiment of the present disclosure including the sensor unit 20 illustrated in FIGS. 7 and 8 can function as a 6-axis force/torque sensor.

FIG. 11 illustrates a minimum-invasive surgery instrument having the force/torque sensor according to an embodiment of the present disclosure at the end of the instrument. In order to employ the force/torque sensor according to an embodiment of the present disclosure to the minimum-invasive surgery instrument, the force/torque sensor is constructed such that a ground unit has a diameter of 10 mm and a height of 10 mm, and a distance between the sensor and the ground unit is set to approximately 0.1 mm.

As illustrated in FIG. 12, 6-axis force/torque are applied to the force/torque sensor according to an embodiment of the present disclosure, and capacitance variations are measured. As a result, as illustrated in FIGS. 13 to 18, it was confirmed that distinct capacitance variations were detected within the ranges of force and torque applied to tissues in the human body during minimum-invasive surgery using the minimum-invasive surgery instrument.

Figure 19:
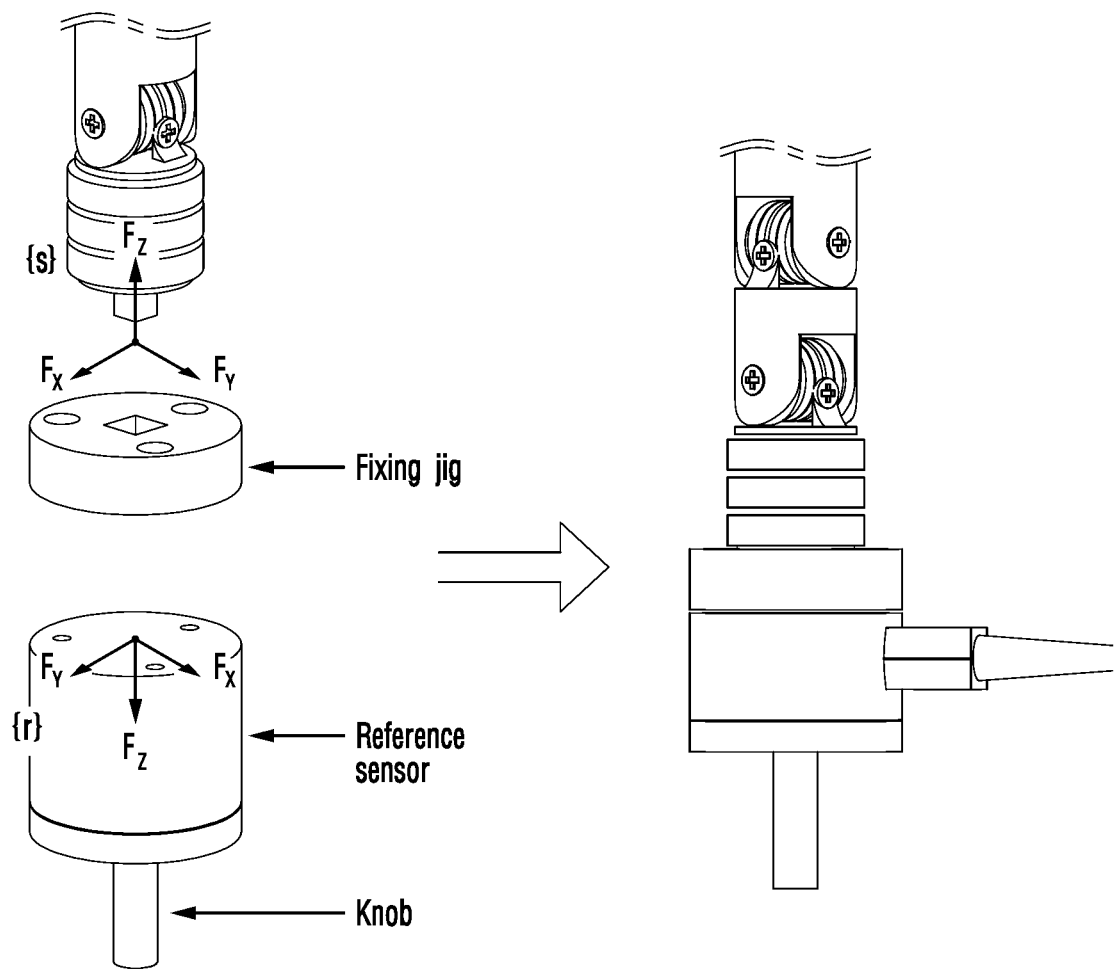
FIG. 19 illustrates an experiment for comparing the force/torque sensor according to an embodiment of the present disclosure with a reference sensor.

In addition, a reference sensor that is commercially available at present in the trade name of Nano 17, which is manufactured by ATI Industrial Automation, and a force/torque sensor according to an embodiment of the present disclosure, were connected using a fixing jig, as illustrated in FIG. 19, and the same levels of force/torque were applied to the respective sensors. Thereafter, force/torque values output from the respective sensors were compared. As a comparison result, as illustrated in FIG. 20, it was confirmed that the force/torque sensor according to an embodiment of the present disclosure and the reference sensor demonstrated equal force/torque values.

As described above, the force/torque sensor according to an embodiment of the present disclosure can detect accurate force/torque values while it is implemented in a smaller size than the minimum-sized reference sensor that is currently available on the market.

While the 6-axis force/torque sensor of the present disclosure has been particularly shown and described with reference to exemplary specific embodiments thereof, it will be understood by those of ordinary skill in the art that various changes in form and details may be made therein without departing from the spirit and scope of the present disclosure as defined by the following claims.

Description of Reference Numerals

| | |
|---|---|
| 10: Ground unit | 10-1: Sensing part |
| 10-2: Deformable part | 10-3: Base part |
| 11: Internal space | 20: Sensor unit |
| 21: Substrate | 30: Support unit |
| 31: First part | 32: Second part |
| H: through-hole | |

What is claimed is:
1. A force/torque sensor comprising:
   a ground unit including a sensing part, a base part, and a deformable part connecting the sensing part and the base part and elastically deformed, wherein the ground unit has an internal space extending to a portion of the sensing part while passing through the base part and the deformable part, and the sensing part forms a sensing electrode;

a sensor unit positioned within the internal space of the sensing electrode, and wherein the sensor unit includes a plurality of electrodes generating capacitances with the sensing electrode; and a support unit combined with the base part and supporting the sensor unit.

2. The force/torque sensor of claim 1, wherein the support unit has a through-hole to allow a portion of the sensor unit to communicate with the outside of the ground unit.

3. The force/torque sensor of claim 1, wherein the deformable part is formed by cutting out a portion of a side surface of the ground unit.

4. A force/torque sensor comprising:

a ground unit including a sensing part, a base part, and a deformable part connecting the sensing part and the base part and elastically deformed, wherein the ground unit has an internal space extending to a portion of the sensing part while passing through the base part and the deformable part;

a sensor unit positioned within the internal space corresponding to the sensing part, wherein the sensor unit includes a plurality of electrodes generating capacitances with the ground unit; and a support unit combined with the base part and supporting the sensor unit, wherein the support unit includes a first part combined with the base part and a second part connecting the first part and the sensor unit, wherein the first part has a sectional area corresponding to the internal space of the base part such that the first part is fitted into the internal space, and wherein the sensor unit has a smaller sectional area than the first part such that the sensor unit is spaced apart from the ground unit in a widthwise direction of the ground unit.

5. The force/torque sensor of claim 4, wherein the second part has a smaller sectional area than the first part in the widthwise direction, and wherein the sensor unit has a length enough to be spaced apart from the ground unit in a lengthwise direction of the ground unit in a state in which the first part is fitted into the base part.

6. The force/torque sensor of claim 1, wherein the plurality of electrodes are rectangular electrodes, and wherein capacitances are generated between top surfaces of each rectangular electrode and the sensing electrode, and between at least one side surface of each rectangular electrode and the sensing electrode.

7. The force/torque sensor of claim 6, wherein the sensor unit includes eight (8) electrodes, each two of which are positioned at four corners of an imaginary rectangle, and wherein the eight electrodes are symmetrical with respect to X- and Y-axis passing the center of the four corners.

8. The force/torque sensor of claim 7, wherein assuming that capacitances generated between the eight electrodes and the sensing electrode are denoted by first to eighth capacitances, when a force in a X-axis direction is exerted, the first and second capacitances are decreased, the fifth and sixth capacitances are increased, and the third, fourth, seventh and eighth capacitances are not changed;

when a force in a Y-axis direction is exerted, the third and fourth capacitances are increased, the seventh and eighth capacitances are decreased, and the first, second, fifth and sixth capacitances are not changed;

when a force in a Z-axis direction perpendicular to the X- and Y axis is exerted, the first to eighth capacitances are increased;

when a torque in the X-axis direction is exerted, one of the first and second capacitances is increased while the other is decreased, one of the fifth and sixth capacitances is increased while the other is decreased, and the third, fourth, seventh and eighth capacitances are not changed;

when a torque in the Y-axis direction is exerted, one of the third and fourth capacitances is increased while the other is decreased, one of the seventh and eighth capacitances is increased while the other is decreased, and the first, second, fifth and sixth capacitances are not changed; and when a torque in the Z-axis direction is exerted, one of the first and second capacitances is increased while the other is decreased, one of the third and fourth capacitances is increased while the other is decreased, one of the fifth and sixth capacitances is increased while the other is decreased, and one of the seventh and eighth capacitances is increased while the other is decreased.

9. The force/torque sensor of claim 6, wherein the sensor unit includes a rectangular substrate having the plurality of electrodes formed thereon, and the internal space of the sensing electrode is a hexahedral space separated from the rectangular substrate by a predetermined distance.

10. The force/torque sensor of claim 9, wherein regions adjacent to vertices of the rectangular substrate are removed.

11. A force/torque sensor comprising:

a ground unit having a sensing electrode, wherein the sensing electrode has an internal space; and a sensor unit positioned within the internal space of the sensing electrode and including a plurality of electrodes generating capacitance with the sensing electrode, wherein the capacitance is varied depending on a change in the distance between the sensing electrode and the plurality of electrodes regardless of a direction in which force/torque are exerted.

12. The force/torque sensor of claim 11, wherein the sensor unit includes eight electrodes, each two of which are positioned at four corners of an imaginary rectangle, and wherein the eight electrodes are symmetrical with respect to X- and Y-axis passing the center of the four corners.

13. The force/torque sensor of claim 12, wherein each of the eight electrodes is disposed such that a top surface and a portion of a side surface face the sensing electrode.

14. The force/torque sensor of claim 13, wherein the internal space is a hexahedral space and the eight electrodes are rectangular electrodes, and wherein at least one side surface of each electrode faces the sensing electrode.

15. The force/torque sensor of claim 14, wherein the substrate is a rectangular substrate, and each two of the eight electrodes are positioned at four sides of the substrate.

16. The force/torque sensor of claim 15, wherein when an external force/torque is not exerted on the force/torque sensor, the first and second electrodes among the eight electrodes, which are positioned closest to a first side surface of the hexahedral space, are equally spaced apart from the first side surface;

the third and fourth electrodes among the eight electrodes, which are positioned closest to a second side surface of the hexahedral space, are equally spaced apart from the second side surface;

the fifth and sixth electrodes among the eight electrodes, which are positioned closest to a third side surface opposite to the first side surface of the hexahedral space, are equally spaced apart from the third side surface;

the seventh and eighth electrodes among the eight electrodes, which are positioned closest to a fourth side surface opposite to the second side surface of the hexahedral space, are equally spaced apart from the fourth side surface; and the first to eighth electrodes are equally spaced apart from a top surface of the hexahedral space.

17. The force/torque sensor of claim 16, wherein assuming that capacitances generated between the first to eighth electrodes and the sensing electrode are denoted by first to eighth capacitances, when a force in a X-axis direction is exerted, the first and second capacitances are decreased, the fifth and sixth capacitances are increased, and the third, fourth, seventh and eighth capacitances are not changed;

when a force in a Y-axis direction is exerted, the third and fourth capacitances are increased, the seventh and eighth capacitances are decreased, and the first, second, fifth and sixth capacitances are not changed;

when a force in a Z-axis direction perpendicular to the X- and Y axis is exerted, the first to eighth capacitances are increased;

when a torque in the X-axis direction is exerted, one of the first and second capacitances is increased while the other is decreased, one of the fifth and sixth capacitances is increased while the other is decreased, and the third, fourth, seventh and eighth capacitances are not changed;

when a torque in the Y-axis direction is exerted, one of the third and fourth capacitances is increased while the other is decreased, one of the seventh and eighth capacitances is increased while the other is decreased, and the first, second, fifth and sixth capacitances are not changed; and when a torque in the Z-axis direction is exerted, one of the first and second capacitances is increased while the other is decreased, one of the third and fourth capacitances is increased while the other is decreased, one of the fifth and sixth capacitances is increased while the other is decreased, and one of the seventh and eighth capacitances is increased while the other is decreased.

18. The force/torque sensor of claim 1, wherein the support unit includes a first part combined with the base part and a second part connecting the first part and the sensor unit, wherein the first part has a sectional area corresponding to the internal space of the base part such that the first part is fitted into the internal space, and wherein the sensor unit has a smaller sectional area than the first part such that the sensor unit is spaced apart from the ground unit in a widthwise direction of the ground unit.

19. The force/torque sensor of claim 18, wherein the second part has a smaller sectional area than the first part in the widthwise direction, and wherein the sensor unit has a length enough to be spaced apart from the ground unit in a lengthwise direction of the ground unit in a state in which the first part is fitted into the base part.

* * * * *